(No Model.)
A. I. FARNAM.
FLY CATCHER FOR USE ON ANIMALS.
No. 544,295. Patented Aug. 13, 1895.
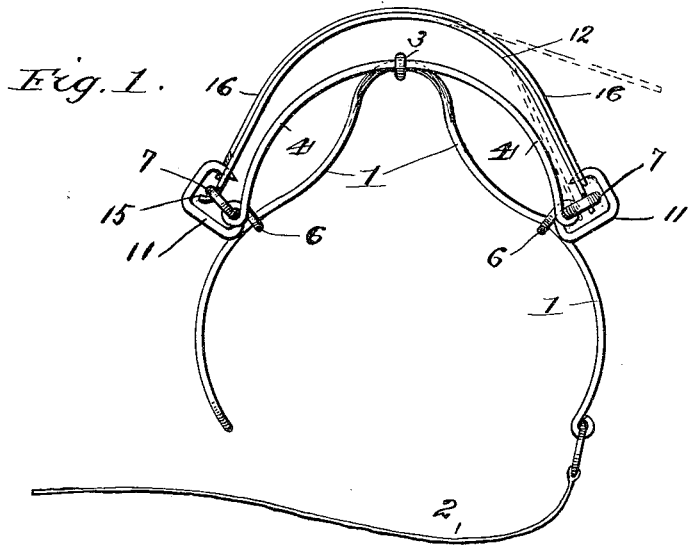
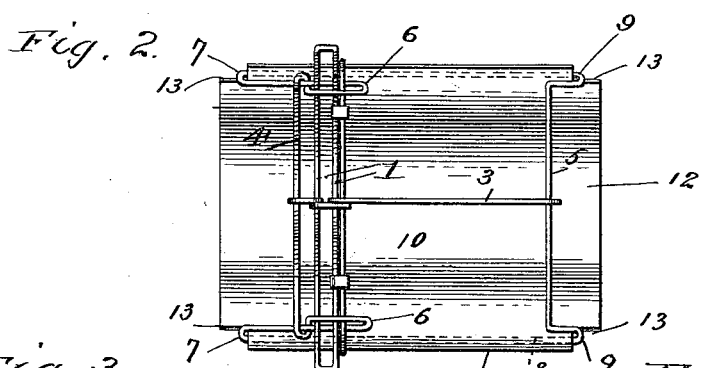
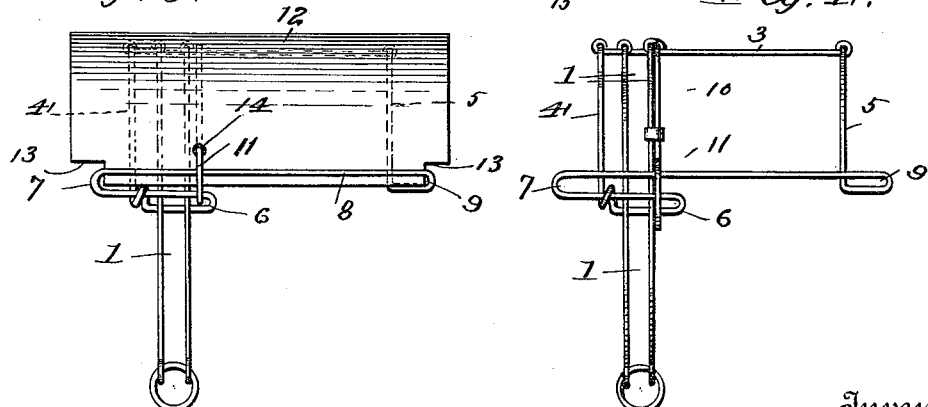

UNITED STATES PATENT OFFICE.

ARLINGTON I. FARNAM, OF DUNHAM, CANADA.

FLY-CATCHER FOR USE ON ANIMALS.

SPECIFICATION forming part of Letters Patent No. 544,295, dated August 13, 1895.

Application filed April 27, 1895. Serial No. 547,376. (No model.)

*To all whom it may concern:*

Be it known that I, ARLINGTON I. FARNAM, a subject of Her Brittanic Majesty, residing at Dunham, in the county of Missisquoi and Province of Quebec, Canada, have invented certain new and useful Improvements in Fly-Catchers for Use on Animals, of which the following is a specification, reference being had therein to the accompanying drawings, in which—

Figure 1 is an end view of the device. Fig. 2 is a bottom plan view thereof. Fig. 3 is a side view thereof. Fig. 4 is a side elevation of the supporting-frame, the carrying-plate being removed.

This invention relates to improvements in devices designed to carry a sheet of fly-catching composition and to be attached upon the backs of animals for the purpose of catching the flies and other insects which bother the cattle; and it has for its object to improve the construction of the device shown in my Patent No. 532,454, dated January 15, 1895.

The invention consists in the novel combination and arrangement of parts hereinafter described, and particularly pointed out in the claims appended.

Referring to the various parts by numerals, 1 designates a saddle-shaped frame which is formed of wire, and is designed to fit over the back of the animal to which the device is to be attached, the lower ends of this frame being bent inwardly to fit closely to the sides of the animal. A strap or cord 2 is permanently attached to one end of this frame, and is designed to pass under the animal and be secured to the other end of the frame 1, to securely hold the device in position. Secured to the center of this frame at its upper edge is a horizontal bar 3, which projects on both sides thereof, as shown, the rearward portion being considerably longer than the forward portion thereof. Carried by this bar at its forward end is a semicircular bar 4, a similar bar 5 being carried by it at its rear end. The ends of the bar 4 are formed into rearwardly-extending horizontal closed loops 6 6, through which the sides of the frame 1 extend. After forming these loops the ends of this bar are carried forward of the semicircular portion thereof for a suitable distance and are then bent upon themselves and carried rearward to a point beyond the rear bar 5, thereby forming the open loops 7 and the horizontal side bars 8. The ends of the bar 5 are bent rearwardly a short distance and are bent upon themselves and are connected to the ends of the side bars 8, thereby forming the open loops 9. The bars 4 and 5 and 8 may be formed of one piece, as shown, or they may be made separately and be suitably secured together.

Secured to the rear side of the frame 1 is a bar 10, which is bent into a semicircular form, its ends passing through the loops 6 6 and being bent upwardly and inwardly to form the hooks 11 11, said loops extending over the bars 8, their inner ends extending inwardly beyond the inner side of said bars. Removably carried by the frame formed by these bars is a sheet of spring metal 12, which is somewhat longer than the frame, its corners being cut out, as at 13, to permit its side edges to fit with the open loops 7 and 9, as clearly shown, the side bars 8 bearing on the outer side thereof near each edge. This plate is provided with perforations 14, through which the points of the hooks 11 pass, and thereby retain it in position. An outwardly-turned flange 15 is formed on one of the side edges of the plate 12, which flange fits under the adjacent side bar 8, and forms an additional securing device for the plate.

A sheet 16 of paper or other material carrying a fly-catching compound is secured in place on the upper side of plate 12 by any suitable means, preferably by passing the hooks 11 through its lower edges, as shown in Fig. 1.

In order to remove the plate 12 and the sheet carrying the fly-catching compound it is simply necessary to press inwardly the edge of the plate formed without the flange 15 until it is free from the adjacent hook 11. It may then be drawn upwardly and the other edge may be easily removed from the other hook 11 and the flange 15 withdrawn from under the side bar 8. When the plate is placed in position, the edge formed with the flange 15 is placed in the open loops 7 and 9, the flange fitting under the bar 8, and the cut-out portions resting on the ends of the loops 7 and 9. The other edge is then bent down and placed in the open loops 7 and 9 on the other side of the frame, and the hooks 11 are engaged in the openings 14.

If desired the frame formed of the parts 3 4 5 6 6 7 8 9 may be dispensed with and the plate 12 carrying the fly-catching compound may be placed directly upon the saddle-shaped frame 1, being held in position by the hooks 11 11 of the bar 10.

It will thus be seen that I provide a device for the purpose set forth, which may be secured to animals in the hottest weather without inconveniencing them in the least, sufficient space being left between the animal's back and the plate 12 to permit a full circulation of air under it.

Having thus fully described my invention, what I claim is—

1. In a fly catcher for animals the combination of a frame bent to approximately fit an animal's back, curved bars 4 and 5 carried thereby, said bars being formed into open loops 7 and 9 at their ends, side-bars 8 connecting said loops, and a removable plate or sheet carried by said frame, said plate or sheet carrying a fly catching compound, and means for securing the frame to the animal, substantially as described.

2. In a fly catcher for animals the combination of a frame, bent to approximately fit an animal's back, an open frame carried thereby, a removable spring metal plate and means for removably securing it to the open frame, a fly-catching composition carried by said plate, and means for securing the device to an animal, substantially as described.

3. The combination of a frame bent to approximately fit an animal's back, bars 4 and 5 carried thereby, said bars forming the open loops 7 and 9, the bar 4 forming the closed loops 6, side-bars 8, 8 connecting the closed loops 7 and 9, hooks 11, 11 carried by the frame, the plate 12 carrying a fly-catching compound and formed with the flange 15 and apertures 14, and means for securing the device to the animal's back, substantially as described and for the purpose set forth.

4. In a fly catcher for animals the combination of a frame composed of bars 1 bent to approximately fit an animal's back, a semi-circular bar 10 carried thereby and formed at its lower ends into upwardly turned hooks 11, and a detachable flexible plate bent over the frame and provided with apertures into which hooks 11 engage, and a fly catching compound carried by said plate, substantially as described.

In testimony whereof I affix my signature in presence of two witnesses.

ARLINGTON I. FARNAM.

Witnesses:
C. S. BORIGHT,
JAMES D. BULMAN.